United States Patent [19]
Colbaugh et al.

[11] Patent Number: 5,221,814
[45] Date of Patent: Jun. 22, 1993

[54] BLIND MOUNTING FACE PLATE AND ANCHOR MEANS

[75] Inventors: Hoyt R. Colbaugh, Norcross; Robert W. Pitts, Atlanta, both of Ga.

[73] Assignee: AMP Incorporated, Harrisburg, Pa.

[21] Appl. No.: 739,942

[22] Filed: Aug. 2, 1991

[51] Int. Cl.⁵ .............................................. H02G 3/12
[52] U.S. Cl. ...................................... 174/66; 174/58; 220/3.6; 220/241; 248/27.1
[58] Field of Search .................. 174/48, 53, 55, 58, 174/66; 248/27.1; 220/3.6, 241

[56] References Cited

U.S. PATENT DOCUMENTS

| | | | |
|---|---|---|---|
| 2,320,400 | 6/1943 | Bedell | 220/3.6 |
| 2,357,787 | 9/1944 | Windsheimer | 220/3.6 |
| 2,401,948 | 6/1946 | Loy | 174/58 X |
| 3,852,513 | 12/1974 | Flahive | 174/55 |
| 3,966,152 | 6/1976 | Bromberg | 248/27.1 |
| 4,066,838 | 1/1978 | Fujita et al. | 248/27.1 X |
| 4,076,364 | 2/1978 | Kuo | 174/55 X |
| 4,304,957 | 12/1981 | Slater et al. | 174/58 X |
| 4,830,316 | 5/1989 | Nehl | 248/27.1 |
| 5,064,386 | 11/1991 | Dale et al. | 439/535 |

*Primary Examiner*—Leo P. Picard
*Assistant Examiner*—David A. Tone
*Attorney, Agent, or Firm*—Robert J. Kapalka

[57] ABSTRACT

A face plate for blind mounting a switch or other device to either a bracket or a wall including an anchor carried by the face plate operable upon rotation in one direction to pull the face plate against the edges of the hole defined in the wall or bracket, whereby to clamp such face plate to the wall or bracket, and operable upon rotation in an opposite direction to release the clamping of the face plate and permit removal of the face plate and device from the wall.

9 Claims, 7 Drawing Sheets

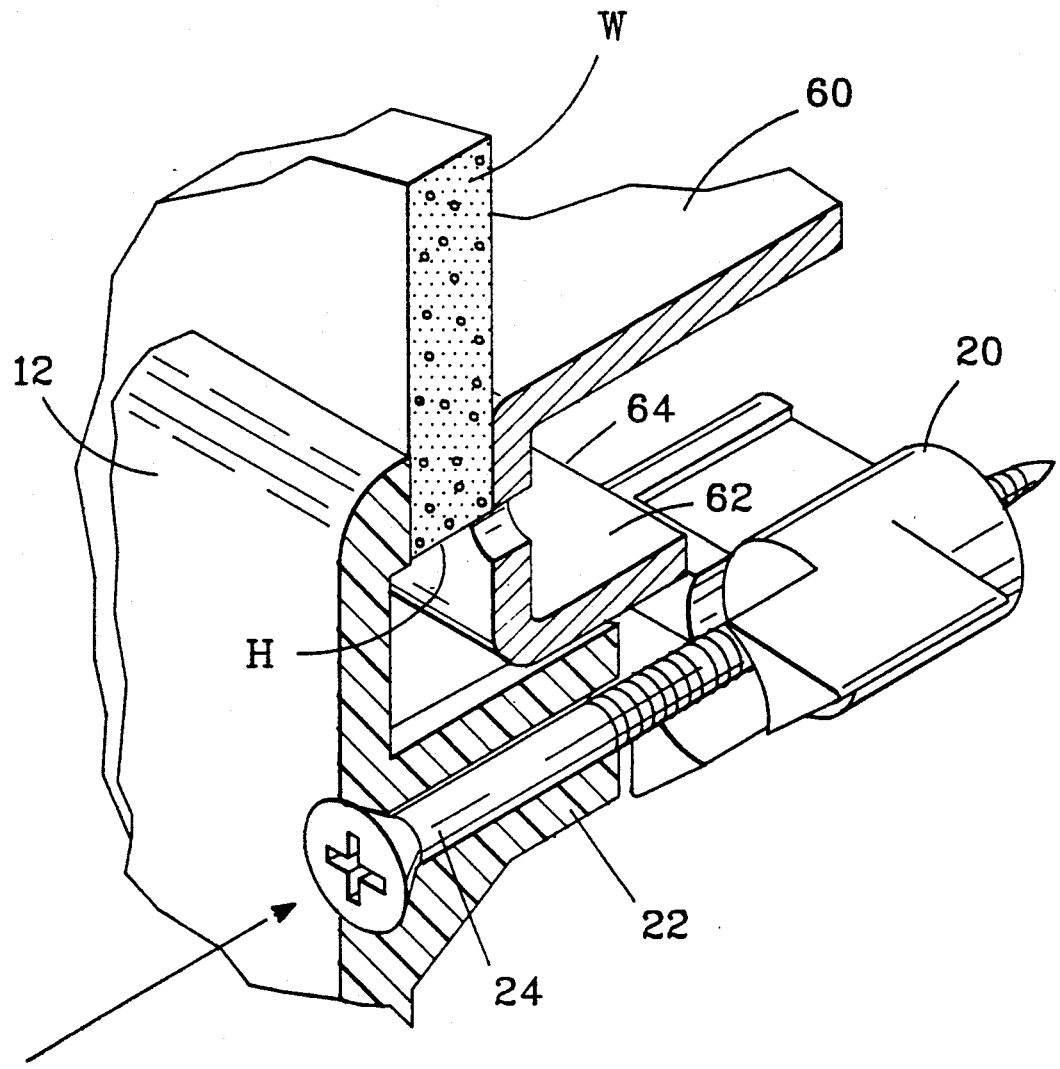
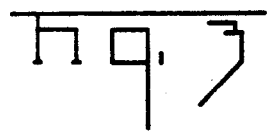

BLIND MOUNTING FACE PLATE AND ANCHOR MEANS

This invention relates to a blind mounting face plate and an anchor therefor for mounting a switch or other device in a wall or the like.

BACKGROUND OF THE INVENTION

Standard wiring practice for wiring buildings up to three stories, houses, modular homes, and other light frame structures is typically done within the walls of such structures. The wiring may be for power or signal, which includes telephone, cable, data and the like, and is typically interconnected to devices which are wall mounted in the interior surface of the structures to include switches, power and signal outlets, and in some instances, sensors and other devices. Present day practice has a variety of wall structures, including principally drywall, a gypsum board typically ½ or ⅝ inch thick, used essentially to resist the spread of fire; plywood and composition board for certain types of factory-built housing, typically ¼ inch or 4 mm in thickness. These various surfaces may be covered with paint, light coatings of plaster, or wallpaper. In the construction of buildings, the wiring is typically rough wired to the various locations of devices in the wall with boxes installed on studs, the wiring pulled into such boxes, with holes made leading to the boxes through the wall covering and devices terminated and attached in a finish wiring step.

U.S. patent application Ser. No. 07/618,766, filed Nov. 27, 1990, details a convenience electrical outlet assembly suitable for use in intelligent wiring systems which employs a bracket adapted to be stud mounted within a housing wall to facilitate a use with power and signal wires in a hybrid cable. Reference is made to such co-pending application and the teaching therein as further background of the present invention.

In general, devices are wall mounted through attachment to boxes within a wall during original construction. Retrofit plastic wall boxes use a plastic latch located on the exterior of the box to latch the box to the drywall. The latch is attached to a screw and is rotatable through 90°, engaging surfaces of the box in the latched and unlatched positions. Further, in add-on modifications to structures, the devices may be wall hung, attaching to a hole made in the wall and including clamping structures which clamp the device to the wall with covering face plates separately added thereafter by screws allowing the face plate to cover the hole and finish the installation of the device.

In such installations, the attachments of devices, including boxes or brackets and/or so-called mud rings which fit around the edges of holes and walls is through a clamping action axially through the wall effected by a screw or other fastener drawing the face plate toward the wall reacting with the box or bracket behind the wall. This makes the installation of devices in walls sensitive to wall thickness and wall variation as well as to critical alignment between apertures in wall plates, boxes, mounting brackets and the like. The practice further complicates the number of parts which must be purchased, handled, inventoried, and assembled on site or in the factory by craftsmen.

Accordingly, it is an object of the present invention to provide a faceplate for blind (from one side) mounting devices in walls of structures which includes, as an integral structural part thereof, the device served by the face plate and anchor means facilitating wall mounting in walls of different constructions, brackets or the like. A further object of the invention is to provide a wall plate device which may be preassembled with anchor means for ease of handling and installation in walls of different thicknesses and characteristics, including those utilizing brackets for mounting. It is yet a further object to provide an assembly, including wall plate, device, and anchoring means, minimizing the need for onsite assembly of fine parts. Furthermore, the anchoring means should permit angular alignment or adjustment of the wall plate.

SUMMARY OF THE INVENTION

The present invention features a face plate which may be used to accommodate a switch or an outlet with the structure of the switch or outlet incorporated into the face plate and carried thereby. The device carried by the face plate may include an electronics assembly for accommodating low voltage switching, a connector, resistors, capacitors, and lamps as well as switch elements, all premounted and incorporated into the face plate. The face plate further includes anchoring means in the form of plastic moldings having a series of three projections and a fastener such as a threaded screw to clamp the face plate in position in the hole of a wall or the hole of a bracket mounted interiorly of such wall as for example on a stud. Two of the projections of the anchor means include surfaces which engage the edge surface of a hole in a bracket or in a wall to lock the anchor means against rotary movement upon rotation of a screw fitted through the anchor means to provide the anchor means with two modes of operation. In the first mode, the anchor means is positioned to allow the installation of a face plate directly into the hole of a bracket without interference and upon engagement with the edge of the hole, cause the anchor means to track axially towards the face plate with the third projection clamping the face plate to the wall, or a bracket therebehind. In the second mode, an opposite rotation of the fastener causes the second projection to engage the edge of the hole with the resulting rotation causing the anchor to back away from the face plate and return to the first mode position allowing removal of the face plate from the hole. The invention includes anchoring means at the top and bottom of the face plate.

IN THE DRAWINGS

FIG. 3 is a perspective view of the elements of FIG. 2 including a section and portion of a wall into which the invention device is installed.

DETAILED DESCRIPTION OF THE INVENTION

Figure 1:
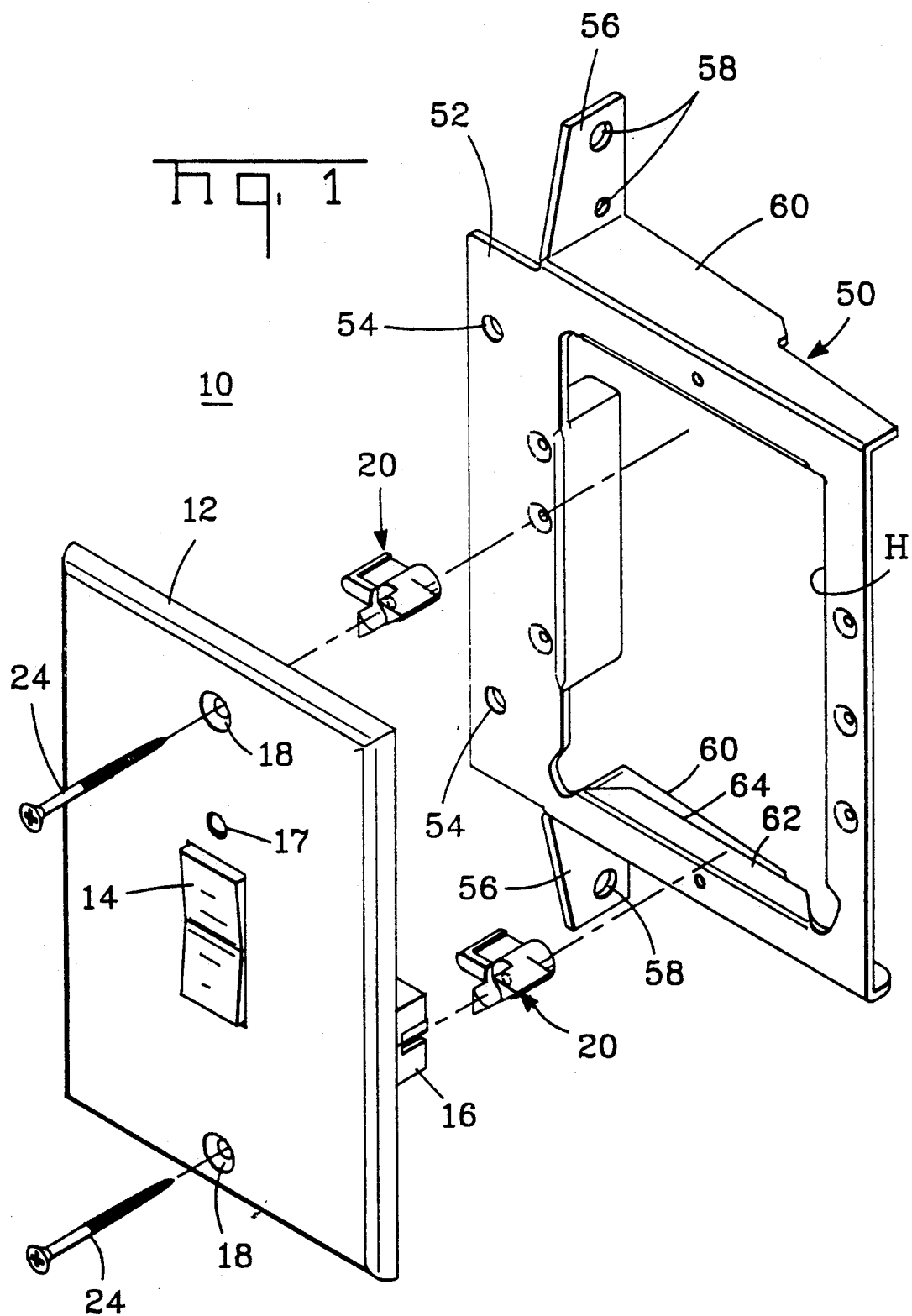
FIG. 1 is a perspective view, exploded to show face plate, wall bracket, anchoring means and fasteners preparatory to assembly of the face plate of this invention.

Referring now to FIG. 1, an assembly 10 is shown to include a face plate 12, anchoring means 20 and fasteners 24 in relation to a bracket 50 upon which the face plate is mounted. Reference is made to the above-mentioned co-pending application which shows the bracket 50 mounted on a stud and further shows a variety of elements prior to assembly to a wall through a hole therein. FIG. 3 shows portions of the anchoring means and face plate and bracket in relation to a wall W having a hole H therein sandwiched between the face plate 12 and bracket 50. The wall W is, in FIG. 3, intended to illustrate the so-called drywall or gypsum board, it being understood that the wall W may have a different composition and in general will have different thicknesses and different constructions as heretofore mentioned. It is further to be understood that in certain instances the face plate may be directly mounted to a wall W without the presence of the bracket 50. In both instances the faceplate, anchor of a device carried by the faceplate, can be blind mounted in a hole H in wall W.

Figure 2:
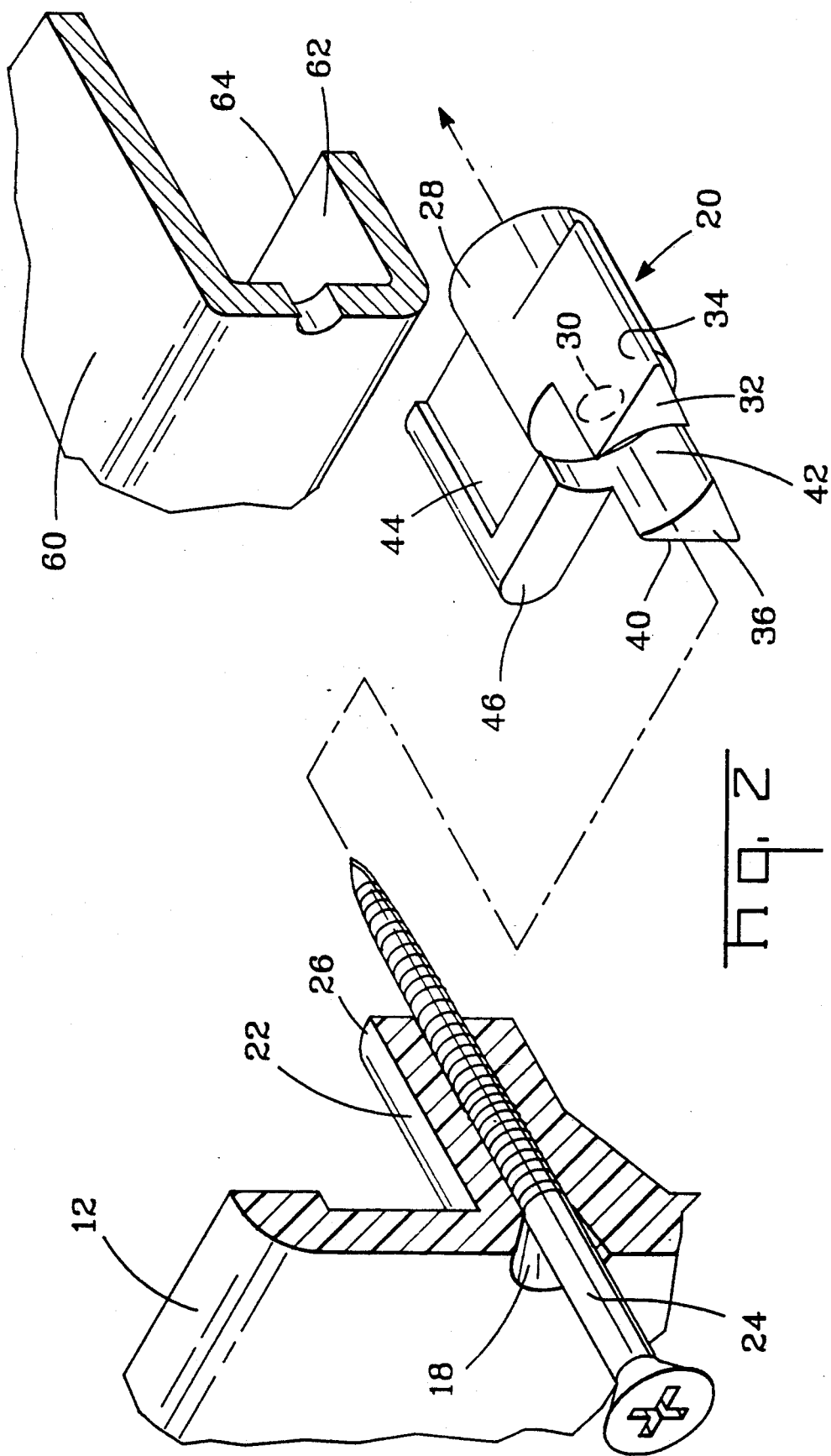
FIG. 2 is a perspective view of portions of the face plate and bracket in conjunction with an anchoring means and fastener, in partial section and exploded prior to assembly.

Referring back to FIG. 1, the face plate 12 may be seen to include a switch rocker 14 extending from the front surface thereof and a connector 16 projecting from the rear face thereof. Reference is hereby made to co-pending application Ser. No. 07/739,564 filed concurrently with the present case, for details relating to the connector and switch device carried by face plate 12. An aperture 17 in the front of the face plate may be utilized for a lamp indicating the on/off condition of the switch carried by face plate 12. An aperture 18, top and bottom, of face plate 12 is employed to accommodate the mounting of anchor elements 20 and fasteners 24. As can be seen from FIG. 2, the apertures 18 which have a tapered entry, extend through an integral projection 22 which includes an exterior surface 26 of a cylindrical configuration. Also shown in FIG. 2 are the details of anchor element 20 to include a body 28 apertured as at 30 to receive the end of fastener 24. Extending from body 28 are projections 32 and 36 which each include flat surfaces delineated 34 and 40 and an interior curved surface 42 which is of a diameter to fit snugly and slidingly with the surface 26 of projection 22 of the face plate 12. The projections 32 and 36 extend axially and radially out from body 28 and a third projection 44, which extends radially from body 28, is provided which includes a surface 46 transverse to the surfaces 34 and 40 and generally parallel to the plane of face plate 12 and of the surfaces of the wall into which the face plate is installed.

Referring back to FIG. 1, the bracket 50 may be seen to include a flange 52 apertured as at 54 which allows the bracket to be anchored to a stud fitted against the interior of the bracket proximate 52 with the adjoining face of the stud engaging flange projections 56 having apertures 58 allowing a further anchoring of the bracket to the stud. Extending transversely to the projections 56 are projections 60 and interior projecting portions or ledges 62 having edges 64 which extend across the bracket, top and bottom, of hole H therein. The bracket 50 serves as a template for cutting a hole in the wall panel. The interior opening of the bracket, bordered by ledges 62, defines this opening H. The surfaces 64 are engaged by surfaces 46 of projection 44 of anchor 20.

Figure 7:
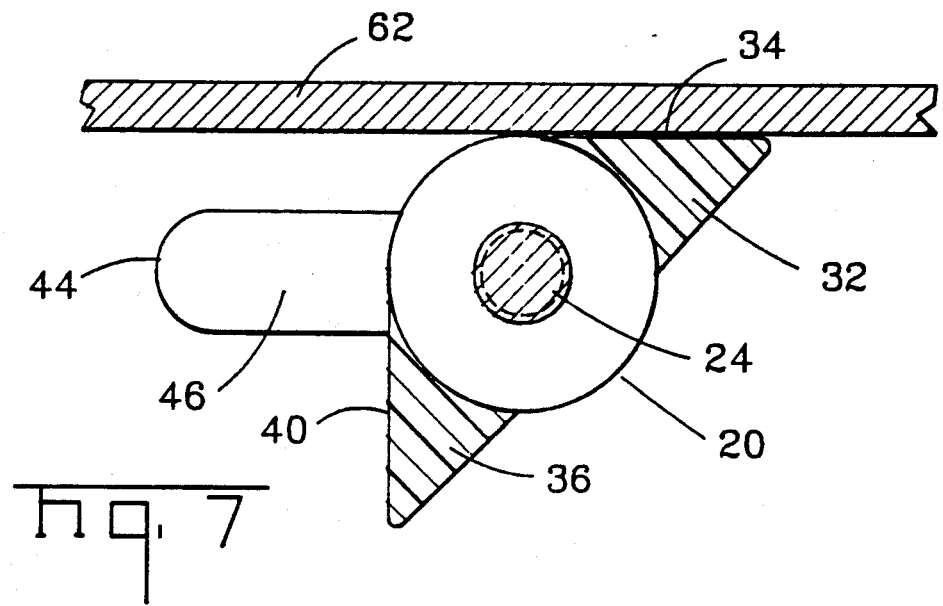
FIG. 7 is an elevational and partially sectioned view showing the anchoring means in an initial install position prior to actuation.

FIG. 3 shows the face plate 12 installed against the front surface of wall W with the hole H therein allowing the device portion of face plate 12, the switch body and connector 16, along with the projections 22 carrying the anchor elements 20 and fasteners 24 to extend within bracket 50. FIG. 7 shows the orientation of anchor 20 and the various projections 32, 36, and 44 thereof when in the insert and unscrew mode of orientation, when the projection 44 is in the disengaged configuration.

Figure 4:
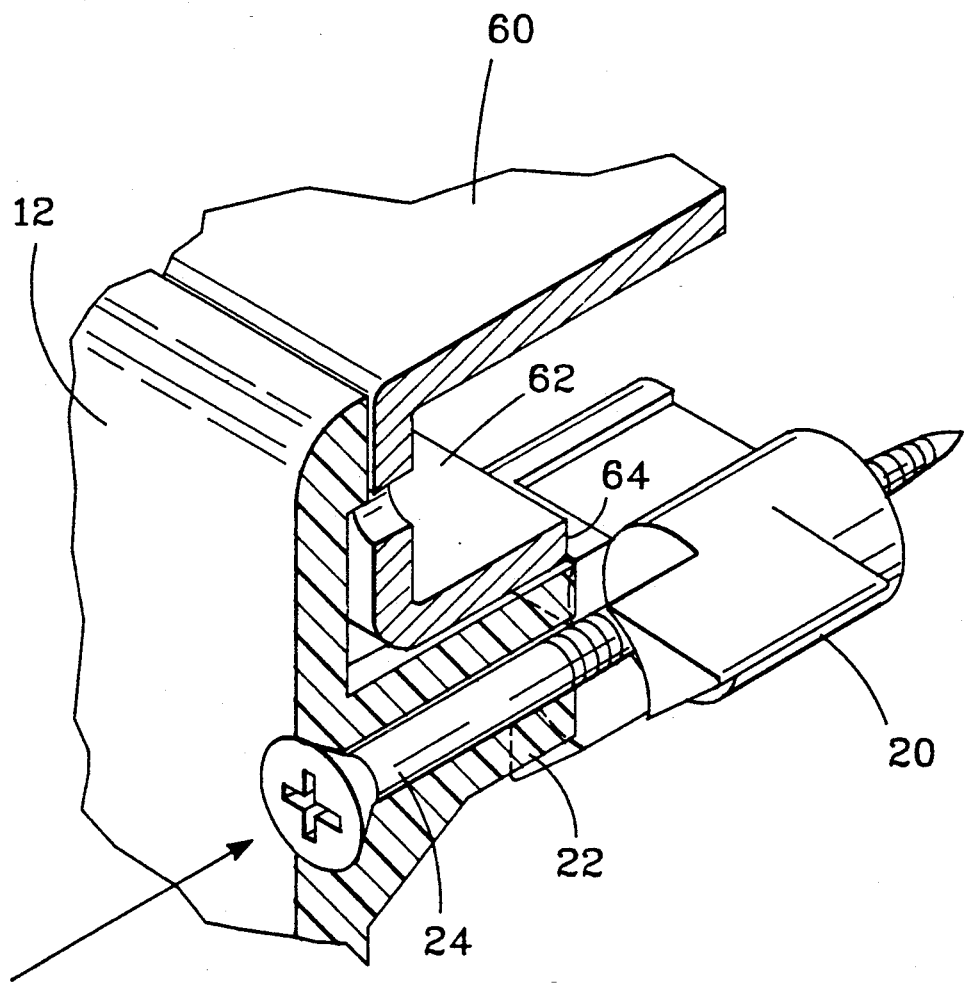
FIG. 4 is a perspective view similar to that of FIG. 3 but without the intermediate wall in position between the face plate and the bracket, prior to actuation of the anchoring means of the invention.
Figure 5:
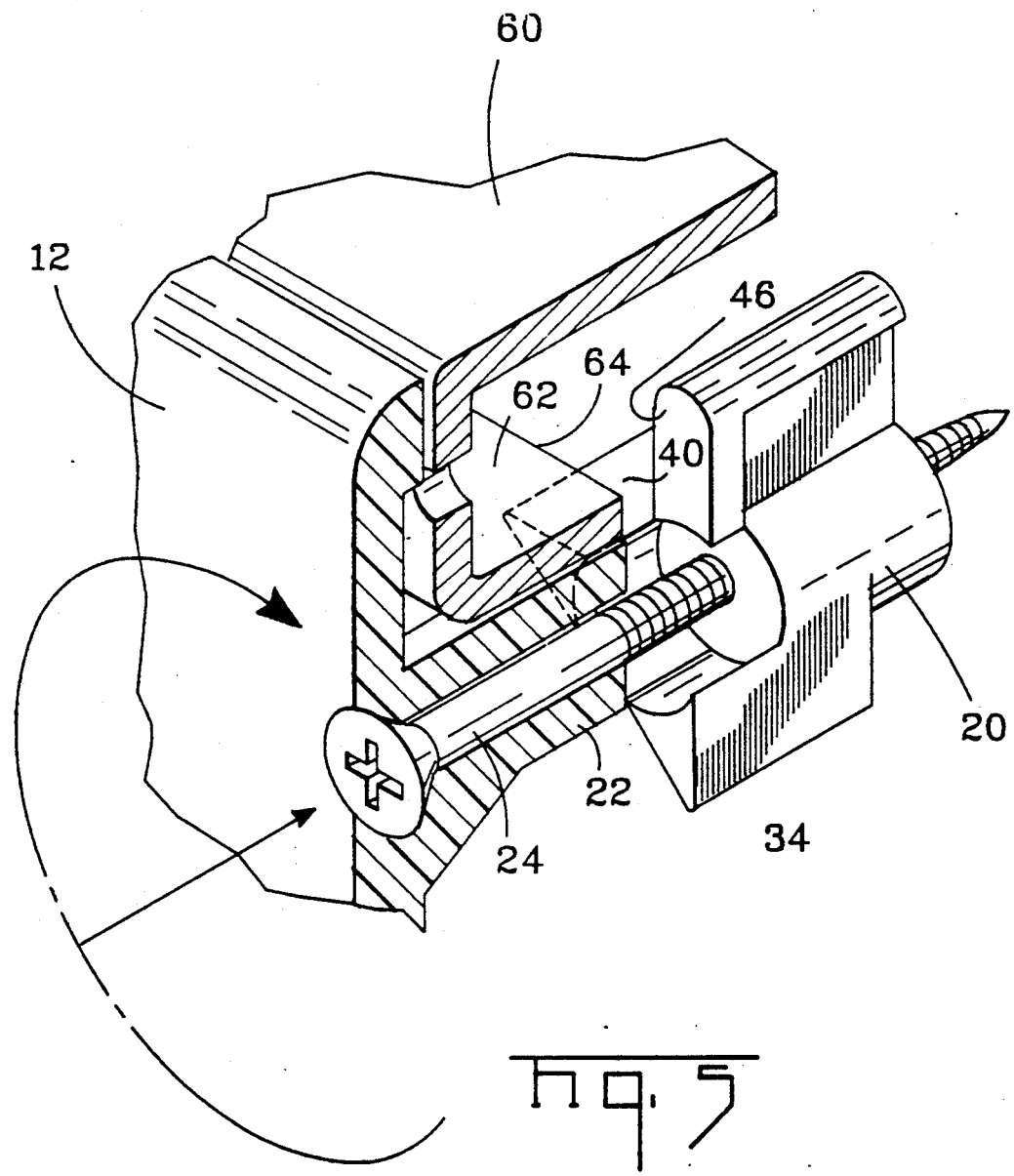
FIG. 5 is a perspective view of the structure of FIG. 4 following initial actuation of the anchoring means of the invention.
Figure 6:
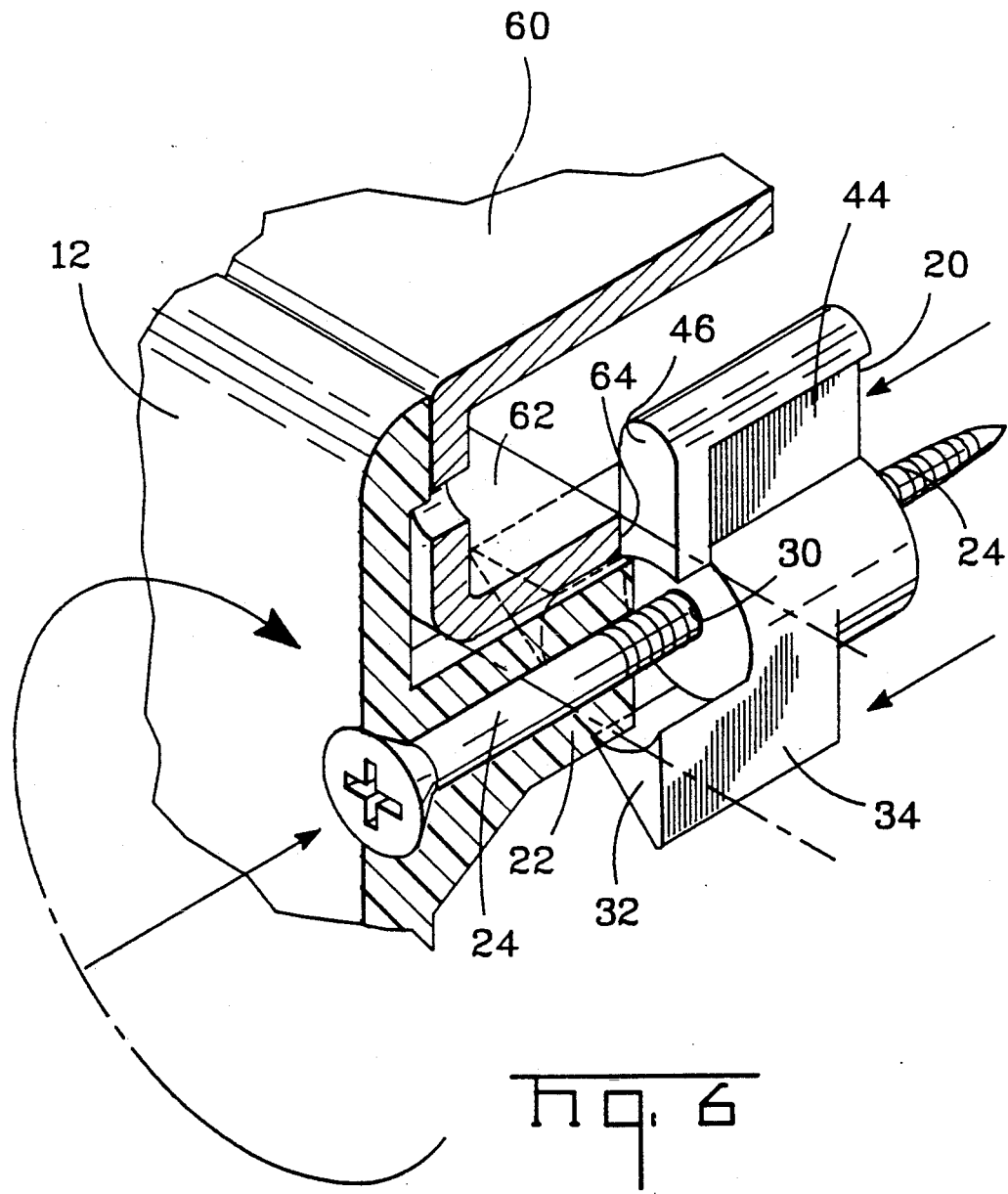
FIG. 6 is a perspective view of the structure of FIG. 5 following actuation of the anchoring means to clamp the face plate in position.
Figure 8:
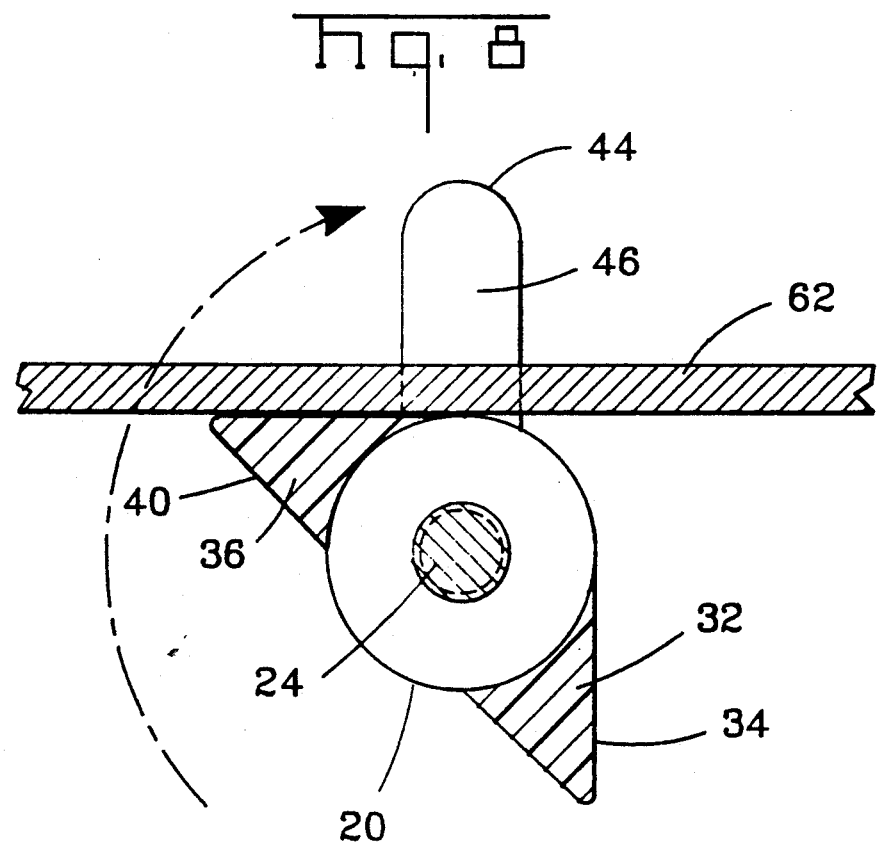
FIG. 8 is a view of the structure of FIG. 7 following actuation.

In accordance with preferred practice of this invention, the anchor 20 is positioned by fastener 24 so that the upper surface 34 of anchor element 20 is proximate the inner surface of the projection 62 of the bracket 50, or in parallel with the surface thereof and overlapping such surface. These elements are preferably dimensioned to functionally fit to hold anchor 20 in a given orientation until activated. As can be seen in FIGS. 3, 4, and 7, the projection 44 is oriented to clear the bracket, the projection 62 allowing insertion of the face plate. The bottom anchor element and fastener of face plate 12 would be similarly oriented to allow insertion of the face plate and anchor element structures. Once the face plate is inserted to the position of FIG. 3 and of FIG. 4, a clockwise rotation of the fastener in the manner indicated in FIG. 5 will cause a rotation of the anchor element 20 from the position shown in FIG. 7 to the position shown in FIG. 8. This position brings the surface 40 of projection 36 of anchor element 20 into engagement with the undersurface of projection 62 which effectively stops rotation of the anchor element 20 with the projection 44 as shown in FIG. 8 extending vertically, so that it overlaps the bracket on the wall adjacent the hole. Thereafter, further rotation of the fastener 24 causes the anchor element to be drawn towards the face plate into the position shown in FIG. 6 wherein the surface 46 bears against the edge surface 64 of the projection 62 of bracket 50 clamping the face plate firmly to the bracket. It is to be understood that in the uses wherein no bracket is employed, as for example, in a device installation in existing walls and particularly with respect to modular or factory homes wherein plywood or wall board is used; and in certain instances, where drywall is used, the surface 34 will engage the edge surface of the hole H of the wall W instead of the undersurface of projection 62. In that case, the surface 46 of projection 44 of the anchor element will engage the rear side surface of the wall W to effect the clamping. In the case wherein the bracket 50 is employed, the hole H is defined by the surfaces therein, including particularly the surface of projection 62 and the edge surfaces of 64. The anchoring mechanism just described is adaptable for use with walls or panels having varying thickness. The anchor element 20 should be prepositioned on the fastener 24 so that surface 34 on projection 32 will engage the inner edge of the opening formed in the wall, panel or bracket. For example the anchor element 20 used in the preferred embodiment of this invention can be prepositioned for use on ½ inch drywall and a mounting bracket by positioning the anchor element 20 with the back end flush with the end of a screw. If the same anchor element is used with ½ inch drywall alone, the inner ends of the projections 32 and 36 are aligned with the end of the projection or boss 22 on the Wall Switch Faceplate.

To remove a face plate from a bracket 50 and/or the wall W, an opposite rotation of the fastener 24 will result in the anchor element 20 rotating 90 degrees until the surface 46 of projection 44 is restored to the position shown in FIG. 7 from the position shown in FIG. 8. Further rotation in a counter-clockwise sense of the fastener 24 will result in the anchor element being backed outwardly, reverse to that shown in FIG. 6 to the position shown in FIG. 4 wherein the face plate is included may be removed, the anchor element and the various projections appropriately aligned with the hole H.

In accordance with operable units of the invention, the face plate and the parts thereof may be molded of engineering plastic material, the anchor elements of a one-piece plastic molding, the fasteners of metal. The fasteners may be provided with appropriate screw threads of a diameter to fit within the anchor elements and form threads therein; in other words, self-tapping. The bracket 50 was formed of heavy steel stock suitably plated to resist corrosion and provide strength for mounting.

Not shown in the present drawings but shown in the co-pending application Ser. No. 07/739,564 is a relationship to a connector carrying signal wires to be drawn through the hole H to plug into the connector 16 and be carried back within the wall upon installation of the face plate 12.

We claim:

1. A face plate for mounting on the surface of a wall, comprising:
    means defining a hole with edge surfaces essentially perpendicular to the wall surface and of a given depth dimension;
    a plate portion extending over the area of said hole to cover said hole and edge surfaces from the front of the wall surface;
    at least two anchor members disposed proximate to at least two of said hole edge surfaces at opposite sides of said hole, each of said anchor members including first and second projections carrying first and second surfaces adapted to engage one of the hole edge surfaces, and a third projection extending radially beyond the first and second projections and carrying a third surface initially disposed beyond said given dimension and oriented to pass through said hole, said anchor members being attached to respective fasteners, said fasteners being operable in one mode to cause said anchor members to be driven in one direction to position said second surfaces against said hole edge surfaces and said third surfaces behind said hole edge surfaces and draw said third surfaces toward said plate portion to clamp said face plate to the wall, and operable in a second mode to cause said anchor members to rotate to bring said first surfaces into engagement with said hole edge surfaces and drive said anchor members oppositely to release said clamping with respect to said plate portion and orient said anchor members to allow removal of said face plate from said wall.

2. The face plate according to claim 1, wherein said means defining a hole is an integral part of said wall with said edge surfaces being defined by said wall.

3. The face plate according to claim 1, wherein said means defining a hole is a bracket behind said wall.

4. The face plate according to claim 1, wherein said anchor member is a one-piece element and said fastener is threadedly engaged with said anchor member.

5. The face plate according to claim 1, wherein said anchor member is an integral piece of plastic material including a bore therein adapted to receive a threaded element on said fastener.

6. The face plate according to claim 1, further including an electrical device carried on the plate portion.

7. The face plate according to claim 6, wherein said anchor member has a cross-sectional profile which in one position facilitates axial insertion into said hole and in another position precludes withdrawal from said hole.

8. The face plate according to claim 1, wherein the third projection is axially displaced from the first and second projections along an axis of the fastener.

9. The face plate according to claim 1 wherein the first surface is parallel to the third projection and the second surface is perpendicular to the third projection.

* * * * *